(12) United States Patent
Planas

(10) Patent No.: US 12,527,949 B2
(45) Date of Patent: Jan. 20, 2026

(54) SYSTEMS AND METHODS FOR PUMPING A NON-BIOLOGICAL LIQUID FLUID THROUGH A STERILIZING FILTER

(71) Applicant: Fenwal, Inc., Lake Zurich, IL (US)

(72) Inventor: Samantha M. Planas, Wauconda, IL (US)

(73) Assignee: Fenwal, Inc., Lake Zurich, IL (US)

( * ) Notice: Subject to any disclaimer, the term of this patent is extended or adjusted under 35 U.S.C. 154(b) by 393 days.

(21) Appl. No.: 16/881,726

(22) Filed: May 22, 2020

(65) Prior Publication Data

US 2021/0361840 A1 Nov. 25, 2021

(51) Int. Cl.
*A61M 60/50* (2021.01)
*A61M 1/00* (2006.01)
(Continued)

(52) U.S. Cl.
CPC .......... *A61M 60/50* (2021.01); *A61M 1/1688* (2014.02); *A61M 1/30* (2013.01);
(Continued)

(58) Field of Classification Search
CPC .. A61M 60/50; A61M 1/1688; A61M 60/279; A61M 1/784; A61M 1/30; A61M 1/3496
See application file for complete search history.

(56) References Cited

U.S. PATENT DOCUMENTS 3,674,396 A 7/1972 McCormick
3,882,861 A * 5/1975 Kettering ............ A61M 60/531
417/43

(Continued)

FOREIGN PATENT DOCUMENTS

CA 2906849 A1 * 9/2014 ............. A61M 1/16
EP 3034113 6/2016
(Continued)

OTHER PUBLICATIONS

European Patent Office, "Extended European Search Report", issued in connection with patent application No. 21175031.0 on Oct. 8, 2021, 7 pages.

(Continued)

*Primary Examiner* — Kai H Weng
*Assistant Examiner* — Kate Elizabeth Strachan
(74) *Attorney, Agent, or Firm* — Cook Alex Ltd.

(57) ABSTRACT

A method is provided for controlling fluid flow through a tubing segment is provided in which a pump draws fluid through the tubing segment using negative pressure P. The method includes the steps of: a) operating the pump at an initial commanded fluid flow rate to draw fluid through the tubing segment; b) measuring on a continuous basis the P in the tubing segment; c) determining into which of four zones the measured P falls, a first zone being where $P>X_1$, a second zone being where $X_1>P>X_2$, a third zone where $X_2>P>X_3$, and a fourth zone where $X_3>P$; d) if P is in the first zone for greater than a first pre-established time period, then increasing the commanded flow rate of the pump and returning to step b); e) if P is in the second zone, then continuing to operate the pump at the flow rate at which the pump is currently operated and returning to step b); f) if P is in the third zone, for greater than a second pre-established time period, then decreasing the commanded flow rate of the pump and returning to step b); and g) if P is in the fourth zone, then commanding the pump to stop. A system including a programmable controller configured to automatically perform the method is also disclosed.

17 Claims, 6 Drawing Sheets

(51) Int. Cl.
*A61M 1/16* (2006.01)
*A61M 1/30* (2006.01)
*A61M 1/34* (2006.01)
*A61M 60/279* (2021.01)

(52) U.S. Cl.
CPC .......... *A61M 1/3496* (2013.01); *A61M 1/784* (2021.05); *A61M 60/279* (2021.01); *A61M 2205/3334* (2013.01)

(56) References Cited

U.S. PATENT DOCUMENTS

| | | | |
|---|---|---|---|
| 5,194,145 | A | 3/1993 | Schoendorfer |
| 5,234,403 | A * | 8/1993 | Yoda ........................ A61M 1/02 604/6.1 |
| 5,360,542 | A | 11/1994 | Williamson et al. |
| 8,961,448 | B2 * | 2/2015 | Forsell ................ A61M 60/857 604/9 |
| 9,594,087 | B2 | 3/2017 | Webber et al. |
| 9,810,611 | B2 | 11/2017 | Webber et al. |
| 10,288,536 | B2 | 5/2019 | Webber et al. |
| 11,123,463 | B2 * | 9/2021 | Tokunaga ........... A61M 60/279 |
| 2009/0211989 | A1 * | 8/2009 | Nguyen .......... A61M 1/362223 210/767 |
| 2016/0101278 | A1 * | 4/2016 | Norris ................... A61M 60/37 604/29 |
| 2016/0175510 | A1 * | 6/2016 | Patel ................. A61M 5/16854 137/12 |
| 2020/0023110 | A1 * | 1/2020 | Jahangir ............... A61M 60/50 |
| 2021/0128807 | A1 * | 5/2021 | Poppe ................ A61M 1/1696 |

FOREIGN PATENT DOCUMENTS

| | | | | |
|---|---|---|---|---|
| EP | 3034113 | A1 * | 6/2016 | ............. A61M 1/02 |
| GB | 1230913 | A | 5/1971 | |
| GB | 2278441 | A | 11/1994 | |
| GB | 2453320 | A | 4/2009 | |
| WO | 2005037182 | A2 | 4/2005 | |
| WO | 2009055592 | A1 | 4/2009 | |
| WO | 2009055595 | A1 | 4/2009 | |
| WO | 2011133453 | A2 | 10/2011 | |
| WO | 2016057982 | | 4/2016 | |
| WO | WO-2016057982 | A1 * | 4/2016 | ............. A61M 1/14 |

OTHER PUBLICATIONS

Search Report under Section 17(5) for Application No. GB2016155.0 dated Mar. 18, 2021.

* cited by examiner

SYSTEMS AND METHODS FOR PUMPING A NON-BIOLOGICAL LIQUID FLUID THROUGH A STERILIZING FILTER

FIELD

The present application relates to the automated processing of blood to separate it into its cellular and non-cellular components using a functionally closed fluid flow circuit and, more particularly, to a method for controlling the flow of saline through the fluid flow circuit.

BACKGROUND

During the separation of blood into its components it is important that the process be performed without compromising the sterility of the resultant blood product. This is typically accomplished by insuring that the inputs to the fluid flow system are themselves sterile. For example, inputs such as saline are typically contained in a bag, bottle or other container that is separate from the fluid flow circuit and needs to be attached to the fluid flow circuit at the time of use.

Consequently, one way for obtaining a sterile blood product is to not connect the saline to the fluid flow circuit until after the product has been collected and the product container removed from the fluid flow system. However, such techniques for maintaining a closed system require additional operator interaction to bypass various automated system controls.

A more efficient, streamlined technique to insure the sterility of such solutions is for the fluid flow circuit to include a sterilizing filter in the tubing segment downstream of the attachment point for the container of the input. When in use, a pump associated with the fluid flow circuit downstream of the sterilizing filter creates a negative pressure to pull the fluid through the filter. However, it is sometimes difficult to control the volume of the fluid introduced into the fluid flow circuit due to inefficient pumping caused by variations in the pump stroke volume due to induced negative pressure.

By way of the present disclosure, a method and automated system are provided for avoiding inefficient pumping while pulling fluid through a filter based on the management of the pressure in the fluid flow circuit downstream of the sterilizing filter in order to more accurately control the volume of saline introduced into the fluid flow circuit.

SUMMARY

There are several aspects of the present subject matter which may be embodied separately or together in the devices, systems, and methods described and/or claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto or later amended. For purposes of this description and claims, unless otherwise expressly indicated, "blood" is intended to include whole blood and blood components, such as concentrated red cells, plasma, platelets and white cells, whether with or without anticoagulant or additives.

The following summary is to acquaint the reader generally with various potential aspects of the present subject matter, and is non-limiting and non-exclusive with respect to the various possible aspects or combinations of aspects. Additional aspects and features may be found in the detailed description herein and/or in the accompanying figures.

In a first aspect, a method is provided for controlling fluid flow through a tubing segment in which a pump draws fluid through the tubing segment using negative pressure P. The method comprises the steps of: a) operating the pump at an initial commanded fluid flow rate to draw fluid through the tubing segment; b) measuring on a continuous basis the P in the tubing segment; c) determining into which of four zones the measured P falls, a first zone being where $P>X_1$, a second zone being where $X_1>P>X_2$, a third zone where $X_2>P>X_3$, and a fourth zone where $X_3>P$; d) if P is in the first zone for greater than a first pre-established time period, then increasing the commanded flow rate of the pump (limited to a maximum flow rate specified by the operator) and returning to step b); e) if P is in the second zone, then continuing to operate the pump at the flow rate at which the pump is currently operated and returning to step b); f) if P is in the third zone, for greater than a second pre-established time period, then decreasing the commanded flow rate of the pump and returning to step b); and g) if P is in the fourth zone, then commanding the pump to stop.

In a second aspect, $X_1=-50$ mmHg, $X_2=-100$ mmHg, and $X_3=-150$ mmHg.

In a third aspect, the first and second pre-established time periods are within a range of from 5 seconds to 20 seconds. The first and second pre-established time periods may be identical, or they may be different.

In a fourth aspect, the initial commanded flow rate is a maximum commanded flow rate In a fifth aspect, the commanded flow rate is increased or decreased in increments of 10.0 mL/min.

In a sixth aspect, P is measured at time increments of 0.1 seconds.

In a seventh aspect, if P is in the fourth zone, the pump is stopped for a third pre-established time period and the pump is then commanded to operate at a decreased flow rate. The third pre-established time period may be 5 seconds.

In an eighth aspect, the method is for controlling the flow of saline through a sterilizing filter during saline rinse or reinfusion phases of a blood separation procedure.

In a ninth aspect, a system is provided for performing a blood separation procedure. The system comprises: a) a disposable fluid flow circuit including a container of fluid and a tubing segment connecting the tubing segment to the fluid flow circuit; and b) a durable hardware component including a pump operable to fluid from the container through the tubing segment, a pressure sensor for measuring the fluid pressure in the tubing segment at a location between the container of fluid and the pump. The programmable controller includes a timer, and is configured to command the pump to operate at a specified flow rate, and to receive a signal from the pressure sensor. The programmable controller is further programmed to command the pump to operate at the specified flow rate in accordance with any of the foregoing aspects.

In a tenth aspect, the container of fluid contains saline and the tubing segment includes a sterilizing filter.

DETAILED DESCRIPTION

A more detailed description of the systems and methods in accordance with the present disclosure is set forth below. The description below of specific devices and methods is intended to be exemplary, and not exhaustive of all possible variations or applications. Thus, the scope of the disclosure is not intended to be limiting, and should be understood to encompass variations or embodiments that would occur to persons of ordinary skill.

In the present disclosure, the method is described in the context of a plasmapheresis procedure in which plasma is collected from a donor. However, the method may be used for controlling flow in any number of different types of blood separation procedures, and not just a plasmapheresis procedure. Further the method may be used to control the flow of any input, regardless of whether it be saline, anticoagulant and/or additive/preservative solution.

With reference to FIGS. 1-6, plasmapheresis is performed using an automated system comprising a hardware component, generally designated 10, and a disposable set, generally designated 12, to collect plasma to be processed as source plasma, which is for reinfusion without further processing, primarily in the form of fresh frozen plasma. As described in greater detail below, the disposable set 12 consists of an integrally connected separator, with various containers and tubing segments for storing and transporting blood, blood components and solutions within a sterile fluid pathway.

Figures 1, 2:
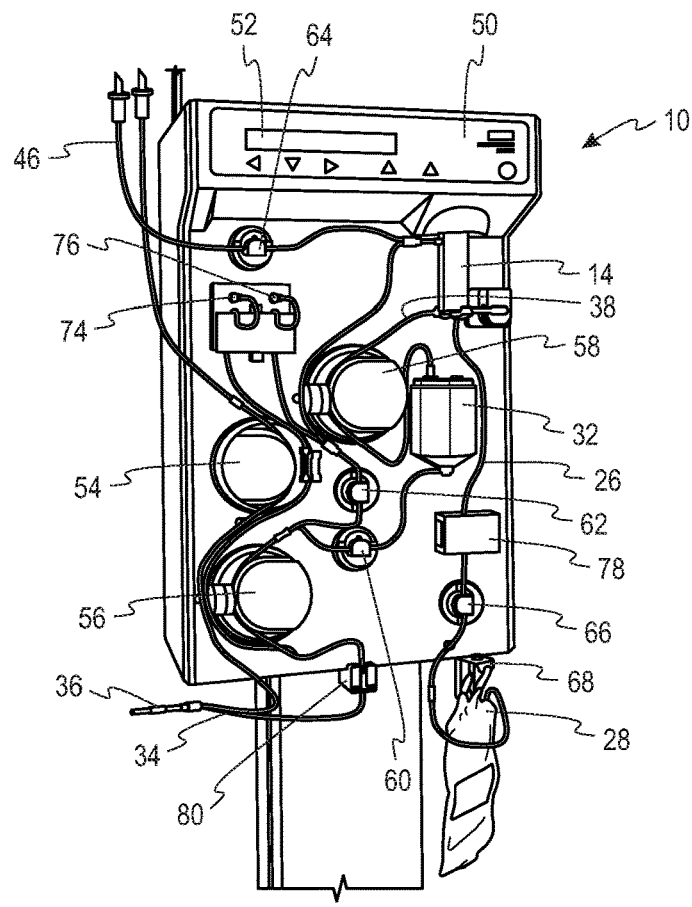
FIG. 1 is a perspective view of a blood separation system comprising a reusable hardware component and a single-use fluid flow circuit configured for the separation of plasma from whole blood from a donor.
FIG. 2 is a plan view of a single-use fluid flow circuit for the collection of plasma for use in the system depicted in FIG. 1.
Figure 3:
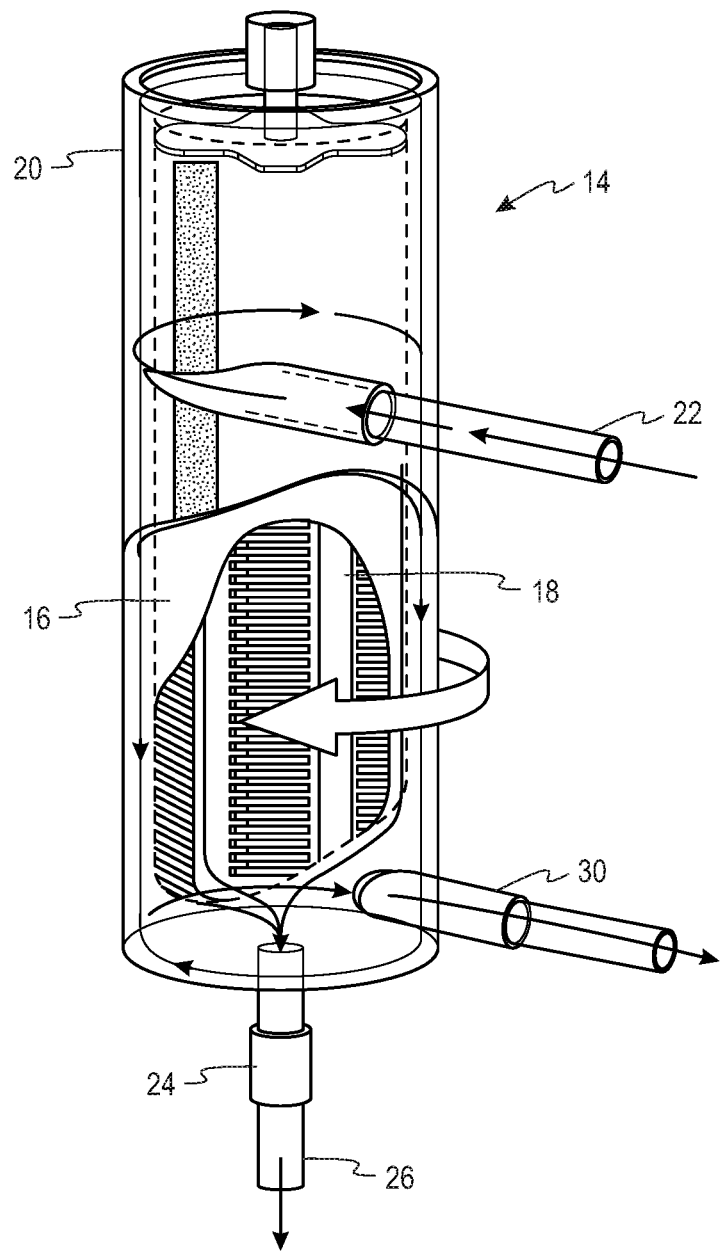
FIG. 3 is a perspective view of a spinning membrane separator of the type incorporated into the disposable set of FIG. 2, with portions broken away to show detail.
Figure 4:
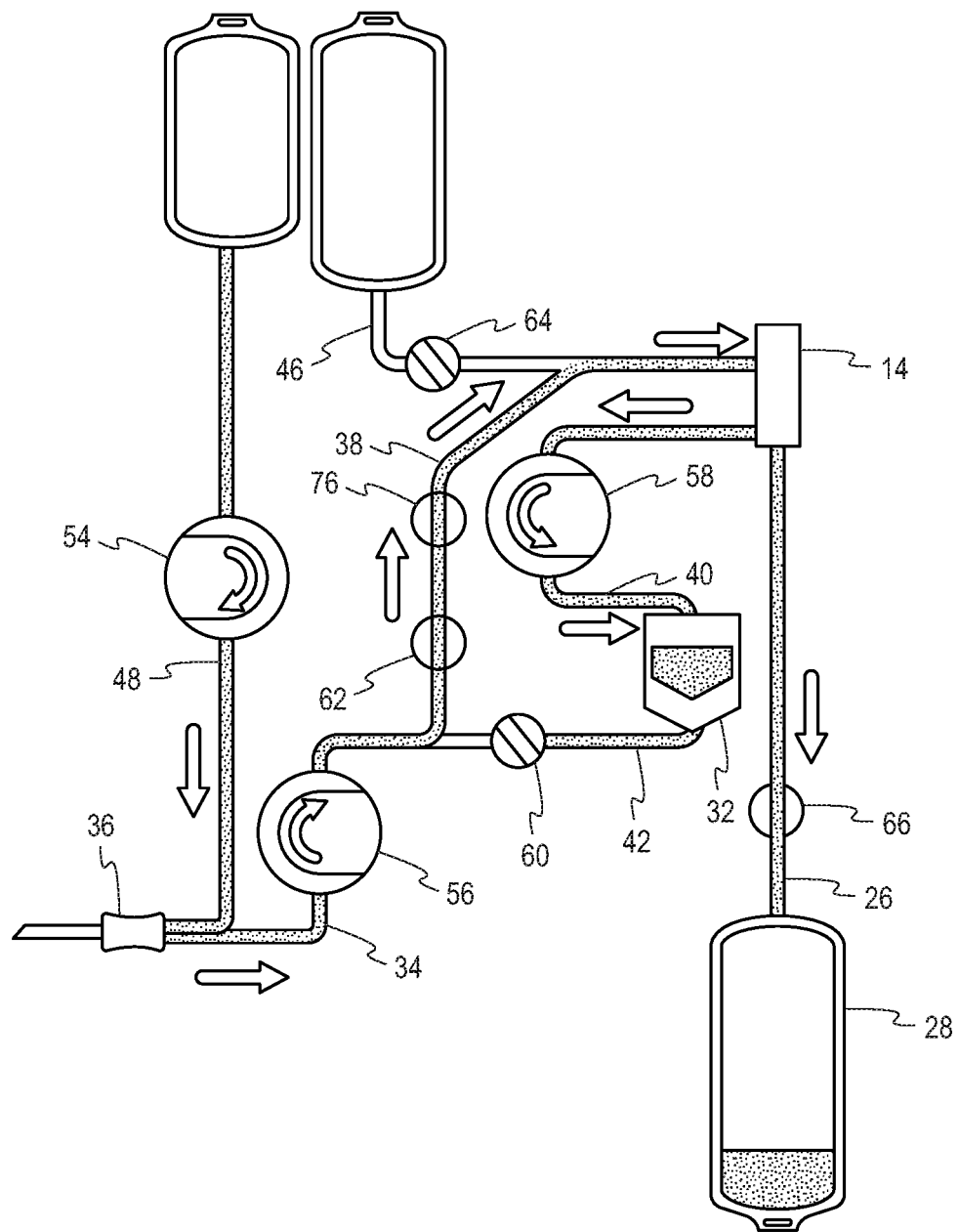
FIG. 4 is a simplified schematic view of the system of FIG. 1 during the blood collection and separation phase of a plasma collection procedure.

The separator 14, best seen in FIG. 3, has a spinning membrane filter 16 mounted to a rotor 18 for rotation within a case 20 to separate blood into components. A detailed description of a spinning membrane separator may be found in U.S. Pat. No. 5,194,145 to Schoendorfer, which is incorporated herein by reference. As can be appreciated, in a different system, separation of the whole blood may be accomplished by centrifugation. See, e.g. U.S. Pat. No. 5,360,542 to Williamson et al.

During plasmapheresis, anticoagulated whole blood enters the separator 14 through a whole blood input port 22. The plasma is separated by the spinning membrane filter and then passes out of a plasma output port 24, through a plasma line 26, and into a plasma collection container 28. Concentrated cells are pumped out of a concentrated cell output port 30 into a reservoir 32, where the cells remain until reinfusion to the donor.

The disposable set 12 also includes tubing lines for introducing whole blood from the donor into the system during collection and returning concentrated cells to the donor during reinfusion (donor line 34, which terminates in the venipuncture needle 36), and for transporting anticoagulated whole blood to the separator (blood line 38), concentrated cells into the reservoir (cell line 40), concentrated cells from the reservoir to the donor line (reinfusion line 42), plasma into the plasma collection container (plasma line 26, identified above), saline (saline line 46), and anticoagulant (AC line 48).

Saline or another replacement fluid (such as an albumin solution) may be used for, e.g., priming the fluid flow circuit, or to rinse the separator of the fluid flow circuit or for reinfusion to the donor after the completion of the separation phase of the collection procedure. The saline line 46, as well as the anticoagulant line 48, terminates in a connector, such as a spike connector, to facilitate the connection of a bag of saline, or anticoagulant, as the case may be, at the time of use. To maintain sterility of the fluid flow circuit downstream of the spike connectors, the saline line 46 and the anticoagulant line 48 each include a sterilizing filter 46a, 48a, respectively.

The hardware component 10 includes a programmable controller 50 and touch screen 52 through which the operator controls the procedure. For example, the touch screen 52 may permit entry of a donor ID, donor gender, donor height, donor weight, donor hematocrit/hemoglobin; a target saline infusion volume (if a saline reinfusion protocol is selected), and a target plasma volume. The touch screen 52 also enables the operator to gather status information and handle error conditions.

Three peristaltic pumps are located on the front panel of the hardware component 10, including an AC pump 54, a blood pump 56, and a cell pump 58. The AC pump 54 delivers anticoagulant solution (AC) at a controlled rate into the blood line 38 as whole blood enters the set from the donor. The blood pump 56 delivers anticoagulated whole blood to the separator during the collection phase of the procedure and returns concentrated cellular components and, if desired, replacement fluid to the donor during the reinfusion phase of the procedure. The cell pump 58 delivers concentrated cellular components from the separator 14 to a reservoir during the collection phase.

The front panel also includes four clamps into which the disposable set 12 is installed, including a reinfusion clamp 60, a blood clamp 62, a saline clamp 64, and a plasma clamp 66. The reinfusion clamp 60 closes to block the reinfusion line (42) during the collection phase (FIG. 5) and is open during the reinfusion phase (FIG. 6) to allow the blood pump to reinfuse the concentrated cellular components from the reservoir 32 to the donor. The blood clamp 62 opens during the collection phase to allow anticoagulated whole blood to be pumped to the separator 14 and closes during the reinfusion phase to block the blood line 38. The saline clamp 64 closes to block the saline line 46 during the collection phase and during reinfusion of the separated cellular components. If saline is to be used as a replacement fluid, the saline clamp 64 opens during the reinfusion phase. The plasma clamp 66 opens during the collection phase to allow plasma to flow into the plasma collection container 28 and closes during the reinfusion phase.

The hardware component 10 includes various weigh scales, including weigh scale 68 to monitor the current plasma collection volume. The system also includes various sensors and detectors, including a venous pressure sensor 74, a separator pressure sensor 76, optical blood detectors 78, and an air detector 80. As illustrated, the pressure sensor 76 is associated with the blood line 38 upstream of its connection with the saline line 46.

The donor is connected to the system throughout the procedure. As illustrated, the disposable set 12 includes a single venipuncture needle 36, through which whole blood is drawn from the donor in a collection phase (FIG. 4) and concentrated cells are returned to the donor in a reinfusion stage. During the collection phase, the whole blood is separated into plasma and concentrated cells. The disposable set includes a plasma collection container 28 for receipt of the separated plasma and a reservoir 32 for receipt of the concentrated cells. During the reinfusion phase, the concentrated cells from the reservoir 32 are reinfused to the donor through the venipuncture needle 36. Typically, plasmapheresis performed with a single venipuncture needle 36 involves multiple cycles of collection and reinfusion, typically followed by a final reinfusion phase of a replacement fluid, such as saline.

Returning to FIG. 4, during the collection phase, anticoagulant solution (AC) is pumped at a controlled rate and mixed with whole blood as it enters the disposable set 12. The anticoagulated blood is pumped to the separator 14, where plasma is separated from the cellular components and directed to the plasma collection container 28.

The cellular components are pumped from the separator 14 to the reservoir 32. The collection phase stops when the reservoir 32 reaches an expected volume of concentrated cells or if the target plasma collection volume has been achieved.

Figure 5:
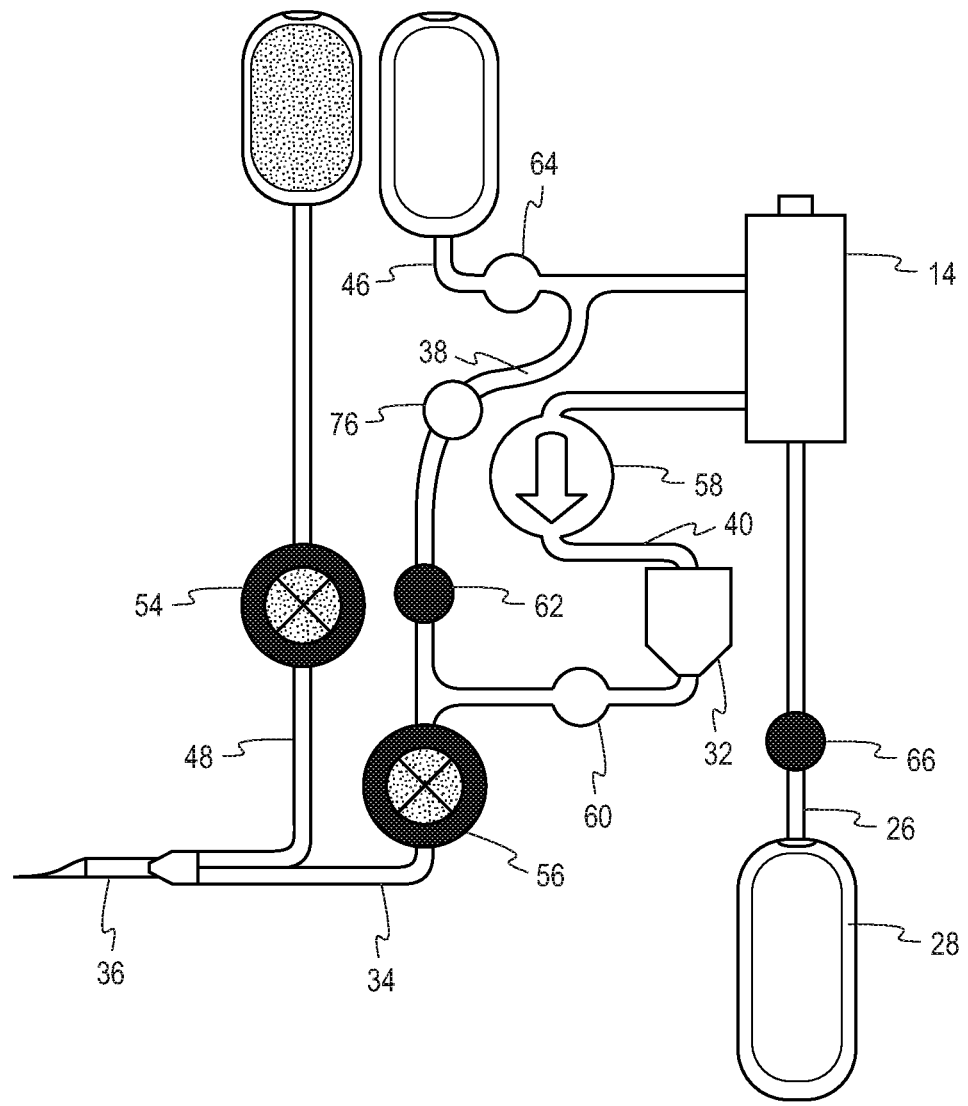
FIG. 5 is a simplified schematic view of the system of FIG. 1 during the saline rinse phase of a plasma collection procedure.

Then, the reinfusion phase begins. During the reinfusion phase, the blood pump 56 reverses direction and pumps the concentrated cells from the reservoir 32 back to the donor through the apheresis needle 36. If a saline protocol is selected, after the final reinfusion of concentrated cells, the separator 14 may be rinsed with saline to flush any remaining cellular components out of the separator 14 and into the reservoir 32. With reference to FIG. 5, if a rinse phase is selected, the reinfusion clamp 60 and saline clamp 64 are opened, and the blood clamp 62 closed and blood pump 56 stopped. The cell pump 58 is operated to draw saline out of the saline container through the saline line 46, through the separator 14 and into the reservoir 32. After the rinse phase is completed, the contents of the reservoir 32, the rinsed residual cells plus the saline used for rinsing the separator, are reinfused to the donor.

Figure 6:
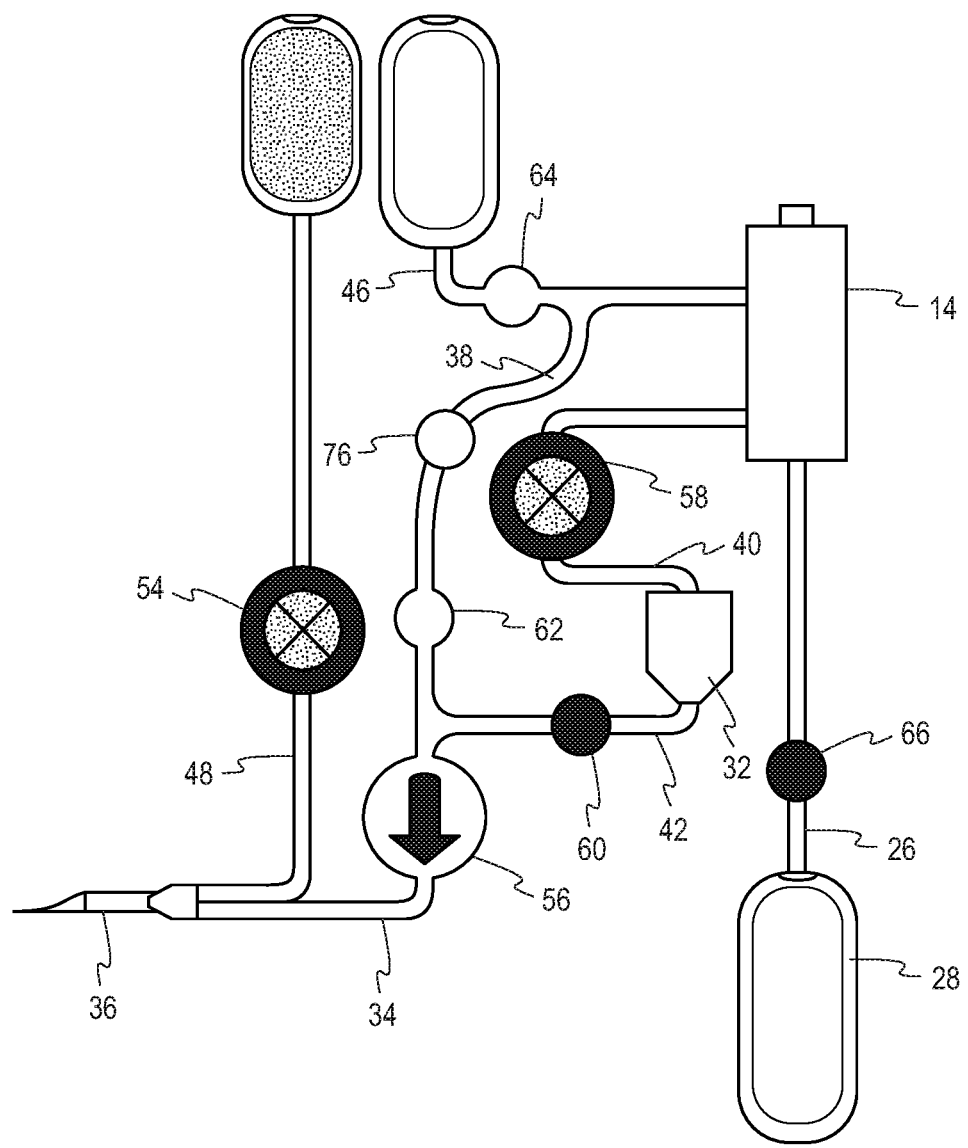
FIG. 6 is a simplified schematic view of the system of FIG. 1 during the saline reinfusion phase of a plasma collection procedure.

If a saline protocol is selected, the cellular reinfusion phase or saline rinse phase is followed by saline infusion in which saline is returned directly to the donor as a replacement fluid for the collected plasma. With reference to FIG. 6, if a saline reinfusion phase is selected, the reinfusion clamp 60 is closed and cell pump 58 stopped to prevent saline from flowing through the separator 14 and into the reservoir 32. The reinfusion clamp 60 and blood clamp 62 are opened and the blood pump 56 is operated to draw saline out of the saline container through the saline line 46 and into the blood line 38. From there, the saline continues to be drawn into and through the donor line 34 by the blood pump 56.

In both the saline rinse and saline reinfusion phases, a pump associated with the fluid flow circuit downstream of the saline container and its associated sterilizing filter creates a negative pressure to pull the fluid through the filter. During the saline rinse phase, it is the operation of the cell pump 58 that creates the negative pressure. During the saline reinfusion phase, it is the blood pump 56 that crates the negative pressure. As noted above, it is sometimes difficult to control the volume of the saline introduced into the fluid flow circuit due to inefficient pumping caused by variations in the pump stroke volume.

Accordingly, by way of the present disclosure, a method for controlling the flow of saline is provided based on controlling the pressure in the blood line 38 (the "$P_2$ pressure"), as measured by the pressure sensor 76.

Figure 7:
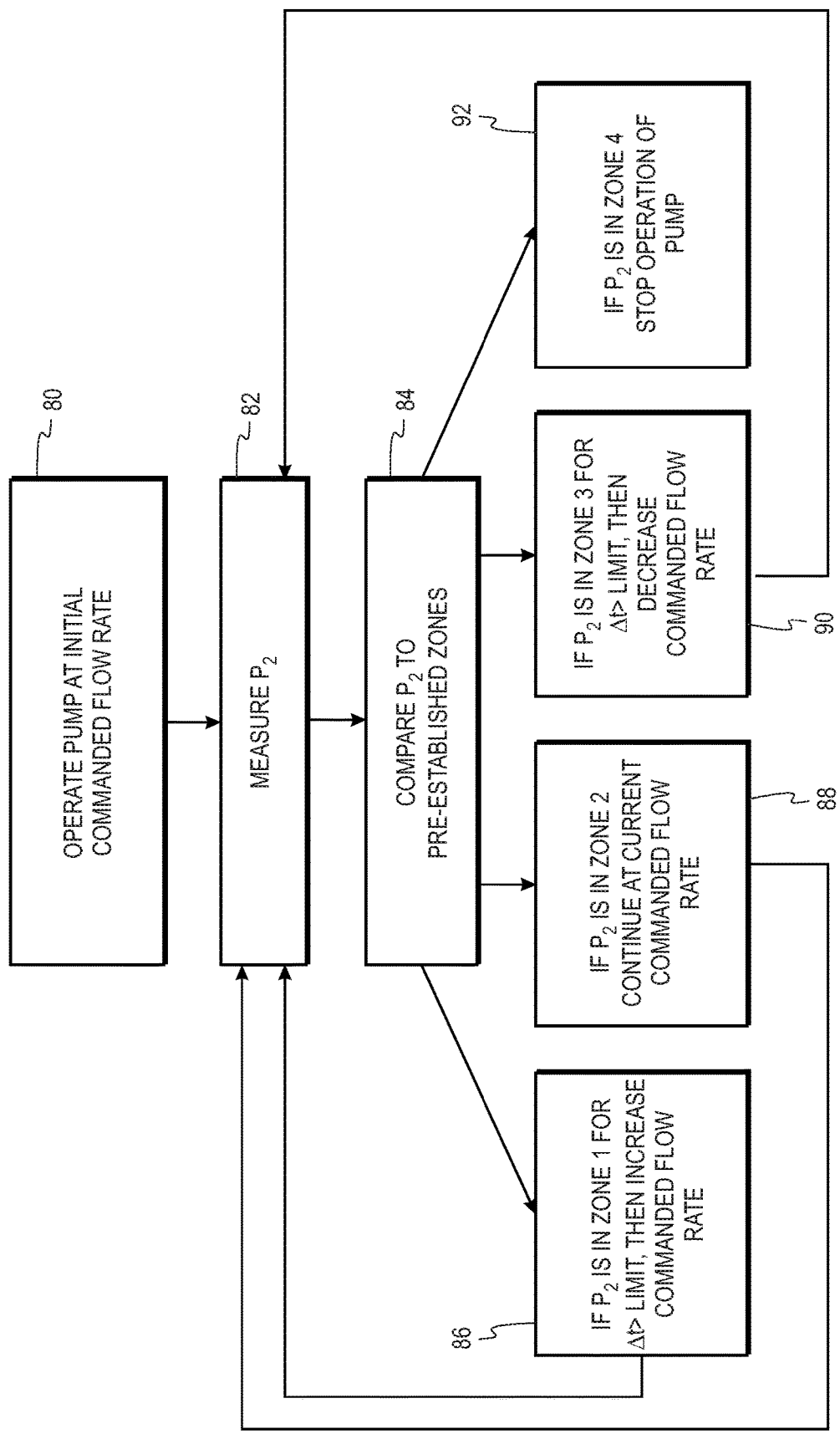
FIG. 7 is a flow chart showing a method for controlling the flow of saline during the saline rinse and reinfusion phases depicted in FIGS. 5 and 6, limited to a specified maximum flow rate.

In general, and with reference to FIG. 7, when the saline rinse or saline reinfusion phase is commenced the appropriate pump (cell pump 58 for the saline rinse phase and blood pump 56 for the saline reinfusion stage) is commanded to operate at an initial flow rate, typically input by the system operator (Box 80).

$P_2$ is measured (Box 82) and compared to a plurality of pre-established/pre-programmed zones (Box 84). The commanded flow rate will then be adjusted based on what zone $P_2$ is in and for how long a period of time $P_2$ has been in that zone. A first zone would be where $P_2 > X_1$. A second zone would be where $X_1 > P_2 > X_2$. A third zone would be where $X_2 > P_2 > X_3$. A fourth zone would be where $X_3 > P_2$.

If $P_2$ is continuously in the first zone for greater than a pre-established period of time, then the commanded flow rate for the pump will be increased (Box 86), limited to a specified maximum flow rate, which may be input by the operator or preprogrammed into the system controller. If $P_2$ is in the second zone, the pump will continue to be operated at the current commanded flow rate (Box 88). If $P_2$ is continuously in the third zone for greater than a pre-established period of time, then the commanded flow rate for the pump will be decreased (Box 90). If $P_2$ is in any of the first, second or third zones, after any adjustments to the commanded flow rate are made, the system returns to Box 82. If $P_2$ is in the fourth zone, then the pump will be commanded to stop (Box 92).

More specifically, the method requires first establishing an initial commanded flow rate zone for saline in, e.g., ml/min, which will be the initial flow rate of saline from the container. The initial commanded flow rate zone may be established by operator input, and is the maximum saline flow rate at which the system is operated until such time that there is sufficient $P_2$ pressure data to determine an optimal flow rate. For the purposes of the discussion that follows, the initial commanded saline flow rate will be referred to as MaxFlowRate, and FlowRate will refer to the commanded saline flow rate at any given time.

The various zones for $P_2$ are also established. These zones may be established experimentally, and then preprogrammed into the controller. By way of example, and in the context of the plasmapheresis system and method described above, four different zones for $P_2$ may be established.

In the first zone, $P_2$ is $> -50$ mmHg, relative to atmospheric pressure. In the first zone, the pressure suggests that a faster flow rate is possible. During the first zone, the GoodFlow counter is run.

In the second zone, $-50$ mmHg $> P_2 > -100$ mmHg, relative to atmospheric pressure. In the second zone, FlowRate is considered to be optimal (an "OKZone"). During the second zone, no flow counter is run.

In the third zone, $-100$ mmHg $> P_2 > -150$ mmHg, relative to atmospheric pressure. In the third zone, the pressure suggests that the flow rate should be slow. During the third zone, the BadFlow counter is run.

In the fourth zone, $P_2$ is $< -150$ mmHg relative to atmospheric pressure. In the fourth zone, the flow is very inefficient and should stop (a "StopZone").

Operation of pump is then commenced to draw saline (at MaxFlowRate) from container through sterilizing filter and into fluid flow circuit. Then $P_2$ and the commanded flow rate (FlowRate) for saline are measured at regular time intervals, e.g., every 0.1 seconds.

If $P_2$ is within the first zone (>−50 mmHg), then on entry to the first zone or upon a change of FlowRate (if prior $P_2$ was not in the first zone or prior FlowRate=current FlowRate), then the GoodFlow counter is started.

The GoodFlow counter is incremented by setting the counter at a new value that is equal to the prior value plus some increment. For example, the counter can be a timer, in seconds, so that the incremented counter value is equal to the prior timer value plus 0.1 second at each clock interval where the conditions are reached.

If the GoodFlow counter>Limit (Δt (in seconds)), then, the FlowRate is set to be equal to the minimum of the operator setting (i.e., MaxFlowRate) or the current FlowRate+10 ml/min). The Δt for the Limit is determined empirically, e.g., by selecting various values for Δt and seeing how the FlowRate responds. The limit for Δt is expected to be in the range of 5-20 seconds, and the result is pre-programmed into the controller.

This same concept applies for each $P_2$ zone. That is, upon entry to a new zone (i.e., when $P_2$ was last checked, $P_2$ was in a different range and/or there was a different FlowRate) the counter is re-started. However, if when $P_2$ was last checked, $P_2$ was in the same range and/or there was the same FlowRate, the counter is incremented upward from the previous count. Consequently, the counter will re-start each time $P_2$ comes back into any zone.

If $P_2$ is <−50 mmHg and >−100 mmHg relative to atmospheric pressure, then the current FlowRate is maintained, and the counters are not incremented.

If $P_2$ is <−100 mmHg and >−150 mmHg relative to atmospheric pressure and on entry to this range or change of FlowRate (prior $P_2$ was not in <−100 and >−150, or prior FlowRate=current FlowRate), then the "BadFlow" counter is started.

If $P_2$ is <−100 mmHg and >−150 mmHg relative to atmospheric pressure, but not on entry to this $P_2$ range or FlowRate, then the "BadFlow" counter is incremented. If the "BadFlow" counter>Limit (Δt (in seconds)), then FlowRate is set to be equal to the maximum of (current FlowRate—10.0 mL/min).

If $P_2$<−150 mmHg relative to atmospheric pressure, then the flow of saline is stopped for 5 seconds. Upon resumption, FlowRate is set to equal current FlowRate—10 mL/min. If FlowRate is equal to -0- for greater than 5 seconds, then the operator is alerted that there is a blockage.

As can be readily appreciated, the controller 50 for the hardware component 10 of the system can be preprogrammed or configured to automatically perform the measuring, comparison and adjustment steps of the method. While the initial commanded flow rate is described as being input by the operator, this could also be pre-programmed into the controller.

Thus, an automated blood processing method and system have been provided that controls the flow of saline through the fluid flow circuit. While the various independent and related aspects of the present subject matter have been described by reference to specifically illustrated structures and methods shown in the accompanying figures, it is understood that the present subject matter is not limited to such specific structures or methods and has application in other forms and devices without departing from the scope of this disclosure. For this reason, reference is required to the following claims to ascertain the scope of the present subject matter.

The invention claimed is:

1. A method for controlling non-biological liquid fluid flow through a tubing segment including a sterilizing filter in which a pump draws a non-biological liquid fluid through the tubing segment and the sterilizing filter using negative pressure P comprising the steps of:
   a) operating the pump at an initial commanded fluid flow rate to draw the non-biological liquid fluid through the tubing segment and the sterilizing filter;
   b) measuring on a continuous basis the P in the tubing segment including the sterilizing filter;
   c) determining into which of four zones the measured P in the tubing segment including the sterilizing filter falls, a first zone being where $P>X_1$, a second zone being where $X_1>P>X_2$, a third zone where $X_2>P>X_3$, and a fourth zone where $X_3>P$;
   d) if P in the tubing segment including the sterilizing filter is in the first zone for greater than a first pre-established time period, then increasing the commanded flow rate of the pump, limited to a specified maximum flow rate, and returning to step b);
   e) if P in the tubing segment including the sterilizing filter is in the second zone, then continuing to operate the pump at the flow rate at which the pump is currently operated and returning to step b);
   f) if P in the tubing segment including the sterilizing filter is in the third zone, for greater than a second pre-established time period, then decreasing the commanded flow rate of the pump and returning to step b); and
   g) if P in the tubing segment including the sterilizing filter is in the fourth zone, then commanding the pump to stop, wherein each of $X_1$, $X_2$, and $X_3$ is a negative pressure value.

2. The method of claim 1 wherein $X_1$=−50 mmHg, $X_2$=−100 mmHg, and $X_3$=−150 mmHg.

3. The method of claim 1 wherein the first and second pre-established time periods are within a range of from 5 seconds to 20 seconds.

4. The method of claim 3 wherein the first and second pre-established time periods are identical.

5. The method of claim 3 wherein the first and second pre-established time periods are different.

6. The method of claim 1 wherein the initial commanded flow rate is a maximum commanded flow rate.

7. The method of claim 1 wherein the commanded flow rate is increased or decreased in increments of 10.0 mL/min.

8. The method of claim 1 wherein P in the tubing segment including the sterilizing filter is measured at time increments of 0.1 seconds.

9. The method of claim 1 wherein if P in the tubing segment including the sterilizing filter is in the fourth zone, the pump is stopped for a third pre-established time period and the pump is then commanded to operate at a decreased flow rate.

10. The method of claim 9 wherein the third pre-established time period is 5 seconds.

11. The method of claim 1 wherein the method is for controlling the flow of saline during saline rinse or reinfusion phases of a blood separation procedure.

12. A system for performing a blood separation procedure comprising:
   a) a disposable fluid flow circuit including a container of a non-biological liquid fluid and a tubing segment that includes a sterilizing filter connecting the container of the non-biological liquid fluid to the fluid flow circuit; and b) a durable hardware component including
a pump operable to draw the non-biological liquid fluid from the container through the tubing segment and the sterilizing filter,
a pressure sensor for measuring the fluid pressure in the tubing segment including the sterilizing filter at a location between the container of the non-biological liquid fluid and the pump, and
a programmable controller including a timer, the programmable controller being configured to command the pump to operate at a specified flow rate, and to receive a signal from the pressure sensor and programmed to command the pump to operate at the specified flow rate in accordance with the method of claim 1.

13. The system of claim 12 wherein the container of the non-biological liquid fluid contains saline.

14. The method of claim 1 wherein the non-biological fluid is an anticoagulant.

15. The method of claim 1 wherein the non-biological fluid is an additive/preservative solution.

16. The system of claim 12 wherein the container of the non-biological liquid fluid contains an anticoagulant.

17. The system of claim 12 wherein the container of the non-biological fluid contains an additive/preservative solution.

* * * * *